(12) United States Patent
Bagrodia et al.

(10) Patent No.: US 6,395,386 B2
(45) Date of Patent: *May 28, 2002

(54) CLEAR, HIGH-BARRIER POLYMER-PLATELET COMPOSITE MULTILAYER STRUCTURES

(75) Inventors: Shriram Bagrodia; Louis Thomas Germinario; Rodney Layne Piner; Jack Wesley Trexler, Jr., all of Kingsport, TN (US)

(73) Assignee: Eastman Chemical Company, Kingsport, TN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,310

(22) Filed: Dec. 11, 1998

Related U.S. Application Data

(60) Provisional application No. 60/076,458, filed on Mar. 2, 1998.

(51) Int. Cl.$^7$ .............................. B32B 5/02; B32B 27/30; B32B 27/32; B32B 27/34; B32B 27/36
(52) U.S. Cl. ..................... 428/323; 428/412; 428/473.5; 428/474.4; 428/474.7; 428/475.2; 428/476.3; 428/476.9; 428/480; 428/483; 428/500; 428/516; 428/518; 428/520; 428/522; 428/523; 428/910
(58) Field of Search ................................. 428/323, 324, 428/331, 412, 473.5, 474.4, 474.7, 475.2, 476.3, 476.9, 480, 483, 522, 518, 516, 520, 523, 910, 500

(56) References Cited

U.S. PATENT DOCUMENTS

| | | |
|---|---|---|
| 2,531,427 A | 11/1950 | Hauser |
| 2,966,506 A | 12/1960 | Jordan |
| 4,081,496 A | 3/1978 | Finlayson |
| 4,105,578 A | 8/1978 | Finlayson |
| 4,116,866 A | 9/1978 | Finlayson |
| 4,208,218 A | 6/1980 | Finlayson |
| 4,239,826 A * | 12/1980 | Knott, II et al. .............. 428/35 |
| 4,391,637 A | 7/1983 | Mardis et al. |
| 4,410,364 A | 10/1983 | Finlayson et al. |
| 4,412,018 A | 10/1983 | Finlayson et al. |
| 4,429,079 A * | 1/1984 | Shibata et al. .............. 525/240 |
| 4,434,075 A | 2/1984 | Mardis et al. |
| 4,434,076 A | 2/1984 | Mardis et al. |
| 4,450,095 A | 5/1984 | Finlayson |
| 4,472,538 A | 9/1984 | Kamigaito et al. |
| 4,517,112 A | 5/1985 | Mardis et al. |
| 4,546,126 A | 10/1985 | Breitenfellner et al. |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. .................. 428/218 |
| 4,725,466 A | 2/1988 | Crass et al. .................... 428/35 |
| 4,739,007 A | 4/1988 | Okada et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |

(List continued on next page.)

FOREIGN PATENT DOCUMENTS

| | | |
|---|---|---|
| EP | 0184094 | 6/1986 |
| EP | 0202532 | 11/1986 |
| EP | 0590263 A2 | 7/1993 |
| EP | 0691376 A1 | 1/1995 |
| EP | 0691212 A1 | 6/1995 |
| EP | 0761739 A1 | 8/1996 |
| EP | 0846723 A1 | 4/1997 |
| EP | 780340 A1 | 6/1997 |
| JP | 1156/75 | 10/1974 |
| JP | 5735/75 | 3/1975 |
| JP | 10196/75 | 4/1975 |
| JP | 29697/50 | 3/1976 |
| JP | 5751/75 | 1/1979 |
| JP | 9-176461 | 7/1997 |
| WO | WO 93/04117 | 3/1993 |
| WO | WO 93/04118 | 3/1993 |
| WO | WO 93/11190 | 6/1993 |
| WO | WO 94/11430 | 5/1994 |
| WO | WO 95/06090 | 3/1995 |
| WO | WO 95/14733 | 6/1995 |
| WO | WO 97/44384 | 11/1997 |
| WO | WO 98/01346 | 1/1998 |

OTHER PUBLICATIONS

MSDS—Polyvinyl Alcohol, Nov. 1998.*
MSDS—Clay (Montmorillonite), Nov. 1998.*
D.J. Greenland, *Journal of Colloid Science.* 18, 647 (1963).
Y. Sugahara et al., *Journal of the Ceramic Society of Japan* 100, 413–416 (1992).
P.B. Massersmith et al. *Journal of Polymer Science.: Polymer Chemistry*, 33, 1047–1057 (1995).
C.O. Oriakhi et al., *Journal of Materials Chemistry.* 6, 103–107 (1996).
*Encyclopedia of Polymer Science and Engineering*, 2$^{nd}$ Edition, vol. 12, 1988, p. 364–383.

Primary Examiner—Paul Thibodeau
Assistant Examiner—Ramsey Zacharia
(74) Attorney, Agent, or Firm—Bernard J. Graves, Jr., Esq.

(57) ABSTRACT

This invention relates to novel multilayer formed articles including, but not limited to containers such as bottles, tubes, pipes, preforms and films (including oriented films such as biaxially oriented) comprising a melt processible resin having dispersed therein a platelet filler. The multilayer formed articles have improved barrier while maintaining excellent clarity. More particularly, the multilayer structures of the present invention display haze values of less than about 2% and carrier resins which are substantially free from platelet particles having a diameter greater than about 15 microns.

15 Claims, 2 Drawing Sheets

U.S. PATENT DOCUMENTS

| | | |
|---|---|---|
| 4,946,365 A | 8/1990 | Kudert et al. |
| 4,983,432 A | 1/1991 | Bissot |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson, Jr. et al. |
| 5,153,062 A | 10/1992 | Grolig et al. |
| 5,164,440 A | 11/1992 | Deguchi et al. |
| 5,164,460 A | 11/1992 | Yano et al. |
| 5,221,507 A | 6/1993 | Beck |
| 5,248,720 A | 9/1993 | Deguchi et al. |
| 5,334,241 A | 8/1994 | Jordan |
| 5,382,650 A | 1/1995 | Kasowski et al. |
| 5,385,776 A | 1/1995 | Maxfield et al. |
| 5,414,042 A | 5/1995 | Yasue et al. |
| 5,523,045 A | 6/1996 | Kudert et al. |
| 5,552,469 A | 9/1996 | Beall et al. |
| 5,578,672 A | 11/1996 | Beall et al. |
| 5,942,320 A * | 8/1999 | Miyake et al. .............. 428/216 |

* cited by examiner

CLEAR, HIGH-BARRIER POLYMER-PLATELET COMPOSITE MULTILAYER STRUCTURES

CROSS REFERENCES TO RELATED APPLICATIONS

This application claims the benefit of U.S. Provisional Application Ser. No. 60/076,458 filed Mar. 2, 1998.

BACKGROUND OF THE INVENTION

There are many bottle and film applications for melt processible plastics with improved barrier properties. Dispersion of platelet like fillers has the potential to improve the oxygen barrier of polymers while maintaining clarity in amorphous film; however, these materials are not suited to processes that involve orientation between the melting point and glass transition temperatures, including stretch blow molding of bottles and biaxial orientation of film, due to the formation of translucent to opaque materials It would therefore be desirable to provide improved barrier properties by use of platelet fillers while retaining the ability to form clear material upon orientation below the melting point temperature.

Many processes to form multilayer stretch blow molded bottles having 2 to 7 layers are known in the art. For example, U.S. Pat. No. 4,646,925 discloses the production of multilayer stretch blow molded bottles comprising an internal layer of unfilled polyethylene-co-vinyl alcohol.

Researchers have attempted to incorporate fillers, including platelet fillers, in an effort to improve the barrier of polyethylene-co-vinyl alcohol used in multilayer bottles; however, the bottles are opaque or have poor appearance due to the large size of the filler particles and have only a minor improvement in barrier compared to bottles prepared using unfilled polyethylene-co-vinyl alcohol due to the low aspect ratios of the filler particles. Japanese Kokai patent No. Hei 9-176461 discloses multilayer polyester bottles having an inner layer containing swellable laminar silicate. However, the laminar silicates are not well dispersed, and therefore provide little or no improvement in barrier of the resulting multilayer structure. U.S. Pat. No. 4,680,208 discloses trilayer stretch blow molded bottles comprising an internal layer of a 0.5 to 30 weight percent glass fiber reinforced composite with either polyethylene-co-vinyl alcohol, metaxylene type polyamide, or polyethylene terephthalate. U.S. Pat. No. 4,983,432 discloses multilayer structures, including bottles, comprising a layer of a composite of polyethylene-co-vinyl alcohol and mica that has a particle size of less than about 74 microns and an aspect ratio less than 50. PCT Application WO 97/44384 is concerned with multilayer toothpaste tube bodies comprising a white, opaque layer of polyethylene-co-vinyl alcohol containing talc particles that have been delaminated by shearing to provide reduced particles size, thickness of less than 1 micron, and increased aspect ratio of less than 35. Similar efforts to delaminate mica particles have provided a reduction in particle size at the expense of a reduction in particle aspect ratio due to breakage of the mica platelets.

European Patent Applications EP 0 590 263 A2, EP 0 691 212 A1 (1996), EP 0 691 376 A1 (1996), and EP 0 761 739 A1 (1997) are concerned with water or solvent cast laminates of a composite comprised of a high hydrogen-bonding resin, such as polyvinyl alcohol and polyethylene-co-vinyl alcohol, and an inorganic laminar compound, such as sodium montmorillonite. European Patent Application EP 0 761 739 A1 (1997) further refines the above applications and is concerned with water cast films of a composite comprising either polyvinyl alcohol and polyethylene-co-vinyl alcohol and an inorganic laminar compound, such as sodium montmorillonite, that has been delaminated to provide particles with high aspect ratio by aggregating the particles by treatment of the aqueous dispersion with either acid or alumina sol prior to evaporating the solvent. However, the preparation of bottles is not contemplated, as the processes of these inventions and the films coating thereby formed are not suitable or practical for use in the manufacture of stretch blow molded bottles comprising an internal layer of the barrier substrate.

U.S. Pat. No. 5,552,469, incorporated herein by reference, describes the preparation of intercalates derived from certain phyllosilicates and water-soluble polymers such as polyvinyl pyrrolidone, polyvinyl alcohol, polyethylene-co-vinyl alcohol, and polyacrylic acid and composite blends prepared from these intercalates. European Patent Application EP 0 846 723 A1 (1998), incorporated herein by reference, is concerned with composites comprising a matrix of polyethylene-co-vinyl alcohol and a phyllosilicate which has been intercalated with a material other than polyethylene-co-vinyl alcohol or its monomers.

There are many examples in the patent literature of polyamide/organoclay composites containing, for example, Nylon-6 and alkyl ammonium treated montmorillonite. Some patents describe the blending of up to 60 weight percent of organoclay materials with a wide range of polymers including polyamides, polyesters, polyurethanes, polycarbonates, polyolefins, vinyl polymers, thermosetting resins and the like. Such high loadings with organoclays are impractical and useless with most polymers because the melt viscosity of the blends increases so much that they cannot be molded. This is especially true with polyesters. Also, clays tend to absorb large quantities of water and attempts to blend them with preformed polyesters at elevated temperatures cause sever degradation of the molecular weight of the polyester.

The following references are of interest with regard to chemically modified organoclay materials: U.S. Pat. Nos. 4,472,538, 4,546,126, 4,676,929, 4,739,007; 4,777,206, 4,810,734; 4,889,885; 4,894,411; 5,091,462; 5,102,948, 5,153,062; 5,164,440; 5,164,460; 5,248,720; 5,382,650; 5,385,776; 5,414,042; 5,552,469; WO Pat. Application Nos. 93/04117; 93/04118; 93/11190; 94/11430, 95/06090; 95/14733; D. J. Greenland, J. Colloid Sci. 18, 647 (1963); Y. Sugahara et al., J. Ceramic Society of Japan 100, 413 (1992); P. B. Massersmith et al., J. Polymer Sci.: Polymer Chem., 33, 1047 (1995); C. O. Sriakhi et al., J. Mater. Chem. 6, 103(1996).

Among the numerous patents that describe the preparation of organoclays containing ammonium salts are U.S. Pat. Nos. 2,531,427; 2,966,506; 4,081,496, 4,105,578; 4,116, 866, 4,208,218; 4,391,637; 4,410,364; 4,412,018; 4,434, 075; 4,434,076, 4,450,095; 4,517,112, 4,677,158; 4,769, 078; 5,110,501; and 5,334,241.

U.S. Pat. No. 4,810,734 describes a process for the preparation of a mixture of organoclay, monomer, and a dispersing medium and subsequent polymerization to obtain a polymer/organoclay composite. The dispersing medium, such as water or alcohol, is required to improve intercalation of the monomer into the organoclay and resulted in reduced process time and formation of composites with improved properties compared to the process using dry organoclay. Although polyesters are disclosed, no working example demonstrates the use of polyesters.

Example II of U.S. Pat. No. 4,889,885 describes the polycondensation of a mixture of dimethyl terephthalate, ethylene glycol, and an organoclay in water to achieve 6.2 weight percent clay in the final PET/organoclay composite. It is known that the addition of water to the preparation of Nylon-6 from caprolactam increases polymerization rate. However, addition of water and alcohols to preparations of PET will have adverse effects on reaction rate, catalyst activity, final IV, and haze in molded articles. Therefore, it is desirable to have a process that does not require the use of water or alcohol as a dispersing aid.

WO 93/04117 discloses a wide range of polymers melt blended with up to 60 weight percent of organoclay. Although use of polyesters is disclosed, specific polyester/organoclay compositions of any molecular weight are not disclosed.

WO 93/04118 discloses a composite material of a melt processible polymer and up to 60 weight percent of organoclay. Among a wide range of thermoplastic polymers, polyesters are listed as operable. Example 6 shows the melt compounding of PET and polypropylene with Claytone APA (a commercial organoclay from Southern Clay Products) in a twin screw extruder. There is no identification of the PET with regard to I.V., and the I.V. is believed to be relatively low (less than about 0.5 dl/g). There is no disclosure which would suggest how to increase the I.V. of the materials disclosed. WO 93/11190 describes similar polymer blends. All examples include polyamides as a polymer component.

U.S. Pat. No. 5,552,469 describes the preparation of intercalates derived from certain clays and water soluble polymers such as polyvinyl pyrrolidone, polyvinyl alcohol, and polyacrylic acid. Although the specification describes a wide range of thermoplastic resins including polyesters and rubbers which can be used in blends with these intercalates, there are no examples teaching how to make such blends.

U.S. Pat. No. 5,578,672 discloses the melt extrusion of a natural clay (not an organoclay), a polymer, and a liquid carrier to prepare an intercalate that is capable of exfoliating into a polymer in the melt. The preparation of intercalates with PET or its monomers with sodium montmorillonite are demonstrated; however, there are no examples teaching how to make the exfoliated composite blends.

U.S. Ser. No. 995,670 discloses a process for the preparation of clear bottles from a polyester-platelet composite by blow molding a molten parison which avoids the opacity formed during a stretch blow molding process.

DESCRIPTION OF THE INVENTION

Figure 1:
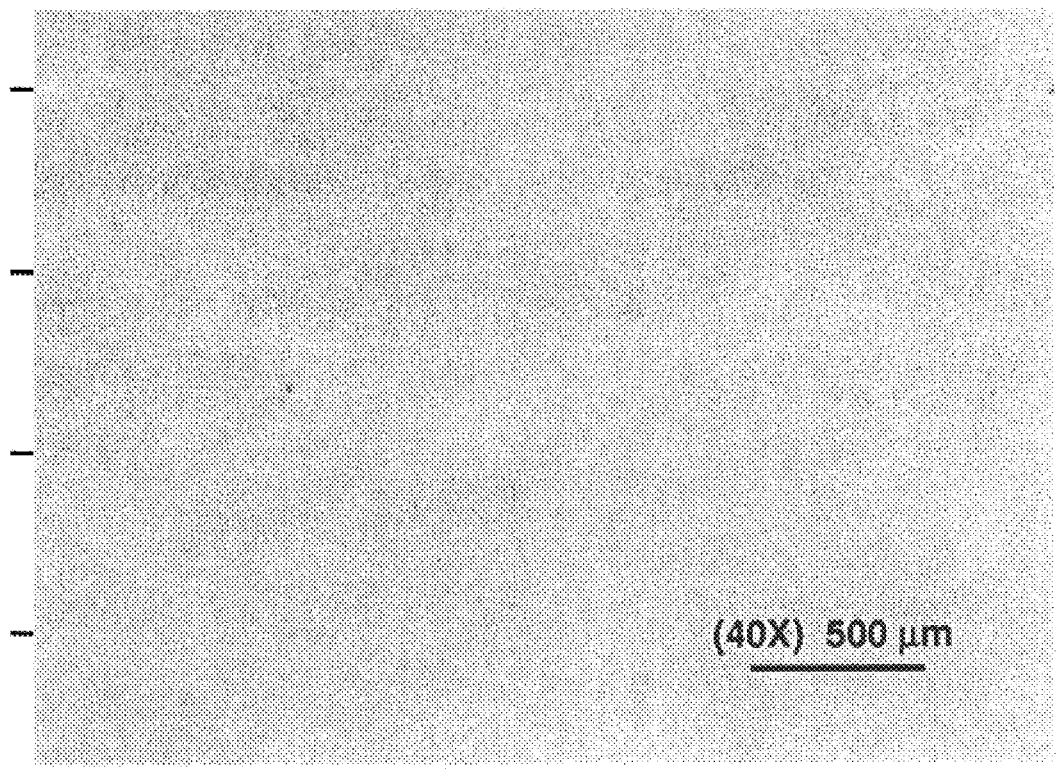
FIG. 1 is a photomicrograph of a trilayer film of the present invention at 40X.

This invention relates to novel multilayer formed articles including, but not limited to containers such as bottles, tubes, pipes, preforms and films (including oriented films such as biaxially oriented) comprising a melt processible resin having dispersed therein a platelet filler. The multilayer formed articles have improved barrier while maintaining excellent clarity. It is particularly surprising that the multilayer structures of the present invention display both good dispersibility of the platelet particles and good clarity, even upon orientation.

More specifically, the present invention relates to multilayer, oriented structures comprising at least one inner layer comprising a carrier resin and at least about 0.01 weight % platelet particles and at least one outer layer comprising a thermoplastic polymer, wherein said multilayer structures display haze values of less than about 2% and said carrier resin is substantially free from platelet particles having a diameter greater than about 15 µm.

It has been found that multilayer structures such as a film comprising an internal layer of a carrier polymer-platelet composite and two external layers of the unfilled polymer can be oriented at temperatures between the glass transition and the melting point to produce oriented articles with improved barrier and excellent clarity. It was surprising that particles which are small as those formed in the present invention would create substantial haze upon orientation. Without being bound by any particular theory, it is believed that the external polymer layers heal the surface defects caused by the presence of filler particles that would otherwise form upon orientation.

This approach can be used to take advantage of the improved barrier properties of the polymer-platelet composites in a wide variety of applications requiring clear, oriented products including film and bottles. Many processes to form oriented multilayer structures in films and bottles are known, and any of these processes may be used in this invention. Formation of multilayer structures having at least two layers and preferably from about 2 to up to about 7 layers are known in the art. This invention includes all multilayer structures, such as films and bottles, having at least one layer comprising a melt processible polymer-platelet composite. An alternate embodiment of the present invention further comprises at least one layer comprising a melt processible polymer which is substantially free of platelet particles. In yet another embodiment the multilayer structure includes at least one additional layer comprising a melt processible polymer having platelet particles in a concentration which may be the same or different than the first layer.

Carrier Polymers

Carrier polymers must be melt processible polymers which are capable of having barrier enhancing platelet particles dispersed therein. Suitable carrier polymers include, but are not limited to, melt processible synthetic polymeric materials, such as polyesters (including, but not limited to wholly aromatic polyesters and water dispersible polyesters), polyamides, copolymers of ethylene and vinyl alcohol, ethyl-vinyl acetate copolymer, polyimides, polycarbonate, polystyrene, polyvinylchloride (PVC), polyacrylates, polyolefins, recycled polymers and mixtures thereof. The preferred carrier polymers are those comprising polyesters, copolymers of ethylene vinyl acetate copolymer, copolymers of ethylene and vinyl alcohol and polyamides. The carrier polymer is present in amounts up to about 99.99 wt %, preferably from about 50 to about 99.99 weight %.

Suitable polyesters include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 7 to 12 carbon atoms. Examples of suitable dicarboxylic acids include phthalic acid, isophthalic acid, naphthalene- 2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from one or more of the above dicarboxylic acids.

Typical glycols used in the polyester include aliphatic glycols containing from two to about ten carbon atoms, aromatic glycols containing from 6 to 15 carbon atoms and cycloaliphatic glycols containing 7 to 14 carbon atoms Preferred glycols include ethylene glycol, 1,4-butanediol, 1,6-hexanediol, 1,4-cyclohexanedimethanol, diethylene glycol and the like. Resourcinol and hydroquinone are preferred glycols for producing fully aromatic polyesters. The glycol component may optionally be modified with up to about 50 mole percent, preferably up to about 25 mole % and most preferably up to about 15 mole % of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(2-hydroxyethoxy)-benzene, 2,2-bis-(4-hydroxycyclohexyl)-propane, 2,4-dihydroxy-1,1, 3,3-tetramethyl-cyclobutane, 2,2-bis-(3-hydroxyethoxyphenyl)-propane, 2,2-bis-(4-hydroxypropoxyphenyl)-propane and the like. Polyesters may be prepared from one or more of the above diols.

Difunctional components such as hydroxybenzoic acid may also be used.

Also small amounts of multifunctional polyols such as trimethylolpropane, pentaerythritol, glycerol and the like may be used if desired When using 1,4-cyclohexanedimethanol, it may be the cis, trans or cis/trans mixtures.

The resin may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

The polyesters of the present invention may be made by any process which is known in the art. Typically polyesters are made via known polycondensation processes. The platelet particles may be added to the polyester at any time, including during melt phase polymerization, after polymerization but prior to solid stating and after polymerization via melt blending.

Suitable polyamides include partially aromatic polyamides, aliphatic polyamides, wholly aromatic polyamides and mixtures thereof. By "partially aromatic polyamide" it is meant that the amide linkage of the partially aromatic polyamide contains at least one aromatic ring and a nonaromatic species.

Suitable polyamides have a film forming molecular weight and preferably an I.V, of greater than about 0.4.

Wholly aromatic polyamides comprise in the molecule chain at least 70 mole % of structural units derived from m-xylylene diamine or a xylylene diamine mixture comprising m-xylylene diamine and up to 30% of p-xylylene diamine and an α∊-aliphatic dicarboxylic acid having 6 to 10 carbon atoms, which are further discribed in Japanese Patent Publications No. 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include: poly(m-xylylene adipamide), poly(hexamethylene isophthalamide), poly(hexamethylene adipamide-co-isophthalamide), poly (hexamethylene adipamide-co-terephthalamide), and poly (hexamethylene isophthalamide-co-terephthalamide). The most preferred partially aromatic polyamide is poly(m-xylylene adipamide).

Preferred aliphatic polyamides include poly (hexamethylene adipamide) and poly(caprolactam). The most preferred aliphatic polyamide is poly(hexamethylene adipamide). Partially aromatic polyamides, are preferred over the aliphatic polyamides where good thermal properties are crucial Preferred aliphatic polyamides include polycapramide (nylon 6), poly-aminoheptanoic acid (nylon 7), poly-aminononanoic acid (nylon 9), polyundecane-amide (nylon 11), polyaurylactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

The most preferred polyamides include poly(m -xylylene adipamide), polycapramide (nylon 6), polyhexamethylene-adipamide (nylon 6,6), and amorphous polyamides.

The polyamides are generally prepared by processes which are known in the art.

Suitable saponified ethylene-vinyl acetate copolymer (hereinafter referred to as "EVOH") include polymer prepared by saponifying an ethylene-vinyl acetate copolymer having an ethylene content of about 15 to about 60 mole % up to a degree of saponification of about 90 to about 100%. The EVOH copolymer should have a molecular weight sufficient for film formation, and a viscosity of generally at least about 0.01 dl/g, especially at least about 0.05 dl/g, when measured at 30° C. in a phenol/water solvent (85:15). Suitable EVOH is available from Eval Company of America. Copolymers having greater than about 30% ethylene content are preferred. Eval-F and Eval-H (about 32 and 38% ethylene content respectively) are commercially available from Eval Company of America and provide particularly desirable gas barrier properties.

Suitable polyimides include condensation polymer derived from bifunctional carboxylic acid anhydrides and primary diamines, such as those disclosed in Encyclopedia of Polymer Science and Engineering, 2$^{nd}$ Edition, vol 12, 1988, p. 364–383. Aromatic polyetherimides, processable in the melt are preferred. An example of a suitable polyimide is ULTEM 1000, which is available from General Electric Co.

Suitable polycarbonates include bis-phenol A based polycarbonates, which are commercially available from General Electric and prepared by reacting 2,2-bis(4-hydroxyphenyl)propane (bisphenol A) and phosgene or a diphenyl carbonate.

Suitable polystyrenes have a melt flow rate (g/10 min., ASTM D-1238) of about 1.4 to about 14 and those that can be extruded into films. Suitable polystyrenes are available from a number of sources, including Dow Chemical Company.

Suitable polyvinylchloride (PVC) includes injection moldable/extrudable grades of PVC. Various additives, such as plasticizers, anti-oxidants, colorants, etc. may also be added. The melt viscosity is adjusted to be able to blow mold. Typically, medium to high molecular weight grades of PVC are used. Melt viscosity is in the range of 1000 to 50,000 poise at processing temperatures. These can be obtained from Geon, Georgia-Gulf and many other PVC suppliers.

Suitable polyolefins, include injection moldable/extrudable grades of polyolefins such as polypropylene, polyethylene, etc. with a wide range of Melt Index of about 0.1 to about 20. Suitable polypropylenes are available from Exxon Chemical Co., Himont, and suitable polyethylenes are available from Eastman Chemical Company.

Suitable recycled polymer includes any recycled carrier polymer having properties suitable for molding.

Also, although not required, additives normally used in any of the above polymers may be used if desired. Such additives include, but are not limited to colorants, pigments, carbon black, glass fibers, fillers, impact modifiers, antioxidants, stabilizers, flame retardants, reheat aids, acetaldehyde reducing compounds, oxygen scavaging compounds and the like.

Unfilled Resin

The exterior layer of the multilayer structure may be independently selected from any of the polymers which are disclosed as suitable for the carrier resin. When the multilayer structure is a container it is preferable that the inner layer which will be in contact with the contents of the container be a material which will not deleteriously effect the contents, either by reaction with the contents or via migration of undesirable compounds from the unfilled resin to the contents. The unfilled resin must also possess adequate stretch and molding characteristics to permit formation of the desired multilayer structure. Finally, the unfilled resin must have compatible molding characteristics with each adjacent polymer layer, including the carrier resin/platelet particle interlayer. It should be appreciated that the unfilled resin may be the same as or different from the carrier resin and that each layer of unfilled resin may also be the same or different. However, in many embodiments it will be preferable to use no more than three different resins, and perhaps no more than two (carrier resin and one unfilled resin in the exterior layers). For many container applications, polyesters, and particularly homo and copolymers of PET will be the preferred unfilled resin.

Also, as above, additives normally used in any of the above polymers may be used if desired. Such additives include, but are not limited to colorants, pigments, carbon black, glass fibers, fillers, impact modifiers, antioxidants, stabilizers, flame retardants, reheat aids, acetaldehyde reducing compounds, oxygen scavaging compounds and the like.

Platelet Particles

Suitable platelet particles of the present invention have a thickness of less than about 2 nm and a diameter in the range of about 10 to about 1000 nm. For the purposes of this invention measurements refer only to the platelet particle and not to any dispersing aids or pretreatment compounds which might be used. Suitable platelet particles are derived from clay materials which are free flowing powders having a cation exchange capacity between about 0.3 and about 3 meq/g and preferably between about 0.8 and about 1.5 meq/g. Examples of suitable clay materials include mica-type layered phyllosilicates, including clays, smectite clays, sodium montmorillonite, sodium hectorite, bentonites, nontronite, beidellite, volkonskoite, saponite, sauconite, magadiite, kenyaite, synthetic sodium hecotorites, and the like. A preferred clay material comprises a montmorillonite-based platelet particle.

Clays of this nature are available from various companies including Southern Clay Products, Kunimine Ind. Co. and Nanocor, Inc. Generally the clay materials are a dense agglomeration of platelet particles which are closely stacked together like cards.

Other non-clay materials having the above described ion exchange capacity and size, such as chalcogens may also be used as the source of platelet particles under the present invention. These materials are known in the art and need not be described in detail here.

Generally, it is desirable to treat the selected clay material to separate the agglomerates of platelet particles to individual platelet particles and small tactoids prior to introducing the platelet particles to the polyester. Separating the platelet particles prior to incorporation into the polyester also improves the polyester/platelet interface. Any treatment that achieves the above goals may be used. Examples of useful treatments include intercalation with water soluble or water insoluble polymers, organic reagents or monomers, silane compounds, metals or organometallics, organic cations to effect cation exchange, surfactants and their combinations. Multilayer structures of the present invention are unique in that the carrier layer is substantially free from platelet particles having a diameter greater than about 15 μm. Preferably the multilayer structures of the present invention comprise platelet particles having a mean platelet particle of less than about 10 microns, and preferably less than about 7 microns. Particle size analysis can be performed by making a micrograph of the multilayer structure and analyzing using Visilog 5 software by Noesis Vision Inc.

Examples of useful pretreatment with polymers and oligomers include those disclosed in U.S. Pat. Nos. 5,552,469 and 5,578,672, incorporated herein by reference. Examples of useful polymers for intercalating the platelet particles include polyvinyl pyrrolidone, polyvinyl alcohol, polyethylene glycol, polytetrahydrofuran, polystyrene, polycaprolactone, certain water dispersable polyesters, Nylon-6 and the like.

Examples of useful pretreatment with organic reagents and monomers include those disclosed in EP 780,340 A1, incorporated herein by reference. Examples of useful organic reagents and monomers for intercalating the platelet particles include dodecylpyrrolidone, caprolactone, aprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

Numerous methods to modify layered particles with organic cations are known, and any of these may be used in the process of this invention. One embodiment of this invention is the modification of a layered particle with an organic cation by the process of dispersing a layered particle material in hot water, most preferably from 50 to 80° C., adding an organic cation salt or combinations of organic cation salts (neat or dissolved in water or alcohol) with agitation, then blending for a period of time sufficient for the organic cations to exchange most of the metal cations present in the galleries between the layers of the clay material. Then, the organically modified layered particle material is isolated by methods known in the art including, but not limited to, filtration, centrifugation, spray drying, and their combinations. It is desirable to use a sufficient amount of the organic cation salt to permit exchange of most of the metal cations in the galleries of the layered particle for organic cations; therefore, at least about 1 equivalent of organic cation salt is used and up to about 3 equivalents of organic cation salt can be used. It is preferred that about 1.1 to 2 equivalents of organic cation salt be used, more preferable about 1.1 to 1.5 equivalents. It is desirable, but not required, to remove most of the metal cation salt and most of the excess organic cation salt by washing and other techniques known in the art. The particle size of the organoclay is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

Also, it is preferred that the platelet particles be well dispersed in the carrier resin. Small particles, when aggregated become more easily visible under magnification. Thus, another measure of good dispersibility is the number of particles in a given area at a given magnification. The carrier resin of the present invention comprises less than about 100 visible platelet particles/mm², preferably less than about 50 visible platelet particles/mm² and more preferably less than about 30 visible platelet particles/mm² at a magnification of 40X.

The process to modify layered particles with organic cations may be conducted in a batch, semi-batch or continuous manner.

Useful organic cation salts for the process of this invention can be represented as follows:

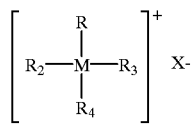

Wherein M represents either nitrogen or phosphorous; X⁻ represents an anion selected from the group consisting of halogen, hydroxide, or acetate anions, preferably chloride and bromide, R, $R_2$, $R_3$ and $R_4$ are independently selected from organic and oligomeric ligands or may be hydrogen.

Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, polycaprolactone, and the like.

Examples of useful organic cations include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, and the like or mixtures thereof, and alkyl phosphonium ions such as tetrabutyl phosphonium, trioctyl octadecyl phosphonium, tetraoctyl phosphonium, octadecyl triphenyl phosphonium, and the like or mixtures thereof. Illustrative examples of suitable polyalkoxylated ammonium compounds include those available under the trade name Ethoquad or Ethomeen from Akzo Chemie America, namely, Ethoquad 18/25 which is octadecyl methyl bis(polyoxyethylene[15]) ammonium chloride and Ethomeen 18/25 which is octadecyl bis (polyoxyethylene[15])amine, wherein the numbers in brackets refer to the total number of ethylene oxide units. The most preferred organic cation is octadecyl methyl bis (polyoxyethylene[15]) ammonium chloride.

If desired, the treated or untreated platelet particles may be further separated into a dispersing medium prior to or during contact with the polymer or polymer precursors. Many such dispersing aids are known, covering a wide range of materials including water, alcohols, ketones, aldehydes, chlorinated solvents, hydrocarbon solvents, aromatic solvents, water dissipatible or dispersible polymers, such as those disclosed in U.S. Ser. No. 995,789, and incorporated herein by reference, and the like or combinations thereof. Useful embodiments include exfoliation or dispersion of treated or untreated platelet particles into ethylene glycol or water with the addition of one or more of the above swelling aids or intercalating compounds.

It should be appreciated that on a total composition basis, dispersing aids and/or pretreatment compounds which are used may account for a significant amount of the total composition, in some cases up to about 30 weight %. For the purposes of this invention the amount of dispersing aids and pretreatment compounds used (if any) in the polymer platelet composite are a part of the amount of polymer specified above. While it is preferred to use as little dispersing aid/pretreatment compounds as possible, the amounts of dispersing aids and/or pretreatment compounds may be as much as about 8 times the amount of the platelet particles.

Methods for Forming Multilayer Structures

Methods for forming multilayer structures are known. Suitable methods include, either singly or in combination, coextrusion, coinjection, injection blow molding, injection overmolding, and the like. U.S. Pat. Nos. 5,221,507; 5,037, 285, 4,946,365; 5,523,045 discloses process and a method for coinjection molding of preforms for multilayer containers. Recently, several new technologies have been invented for co-injection molding preforms. Japanese Kokai patent no Hei 9-176461 disclose multilayer bottles containing polyester based nanocomposites. However, the size of the particles in the nanocomposite layer are very large and this results in lower barrier properties. WO 98/01346 discloses containers containing nanocomposites that are limited to polyesters or copolyesters only.

The following examples further illustrate the invention.

EXAMPLES

Percent haze measurements were obtained according to ASTM D-1003 using a Hunter Lab Ultrascan Colorimeter. Oxygen permeability measurements were obtained according to ASTM D-3985 using a MOCON Oxtran-1000 instrument at 30° C. and 68% relative humidity with a pure oxygen permeant and a nitrogen gas carrier.

Two, 1" Killion extruders with the screw L:D of 24 1 were used along with a Killion co-extrusion block for 1" system to produce the 6" wide trilayer coextruded films of the A/B/A type. The films were extruded through a film die and wound using the take-up system. The "B" layer was the carrier resin/platelet particle resin. Polymers "A" and "B" were dried in dryers at appropriate temperatures before extrusion.

Comparative Example 1

PET-9921 pellets (Eastman Chemical Company, I.V. 0.80) were dried at 150 C for 6 hours then extruded through a 1 inch Killion extruder and a 6" film die into film having a total thickness of about 530 microns. The melt processing temperature was 286 C and the extruder RPM was 98. The film was biaxially oriented 4×4 at 100° C. using a T. M. Long instrument. The oriented film exhibited about 0.3% haze and an oxygen permeability of about 7.1 cc-mil/ 100sq.in.-day-atm.

Comparative Example 2

A dispersion was formed comprising 80 parts of AQ-55 (a water dispersible polyester available from Eastman Chemical Company), 30 parts of an organoclay that was cation exchanged with octadecyl,trimethyl ammonium, and 700 parts of purified water. The dispersion was poured over 1000 parts of PET-9921 pellets and evaporated by heating at 85° C. under a dynamic nitrogen atmosphere. The coated pellets were further dried in a convection oven at 110° C. overnight then extruded at 280° C. using a Leistritz Micro-18 twin-screw extruder with a screw speed of 200 rpm and feed rate of 2.5 kg/hr. The molten strand was quenched in chilled water and chopped immediately. The polyester-platelet composite pellets were dried at 100° C. overnight in a force air oven then extruded into 4 inch wide film having a thickness of about 430 microns. The film was biaxialy oriented 4×4 at 100° C. using a T. M. Long instrument. The oriented film exhibited about 20% haze and an oxygen permeability of about 5.3 cc-mil/100 sq.in.-day-atm. The film sample had about 2% clay (ash).

Although oriented film of polymer-platelet composites of this example have improved barrier to oxygen, they also have an unacceptably high percent haze (20%). Haze levels greater than 2% are unacceptable for most food and beverage packaging. Unfortunately the haze levels observed in this example are typical for oriented polymer-platelet monolayer film, when orientation is conducted at temperatures between the glass transition and melting point temperatures.

Examples 1–3

PET-9921 pellets and polyester-platelet pellets formed as described in Comparative Examples 1 and 2 were dried separately then coextruded to form a trilayer film having the total thicknesses and layer thicknesses listed in Table 1, below. The tri-layered films were biaxialy oriented 4×4 at 100° C. using a T. M. Long. The haze and oxygen permeability of each film was measured as described above. The results are shown in Table 1, below.

TABLE 1

| Ex. # | layer 1 thick ($\mu$) | center layer thick ($\mu$) | layer 3 thick ($\mu$) | total thick ($\mu$) | haze | Oxygen permeability (cc-mil/100 sq.in.-day-atm.) |
|---|---|---|---|---|---|---|
| 1 | 188 | 37 | 208 | 434 | 0.6% | 6.0 |
| 2 | 228 | 64 | 158 | 450 | 0.9% | 6.7 |
| 3 | 74 | 188 | 114 | 376 | 1.7% | 5.7 |

The multilayer oriented film of the present invention display significantly improved barrier compared to the PET-9921 control (Comparative Example 1, 7.1 cc-mil/100 sq.in.-day-atm) and significantly improved haze compared to the orienting polymer-platelet monolayer film (Comparative Example 2).

These examples also show that multilayer structures comprising substantial carrier resin/platelet particle layers (at least 50% of a polymer-platelet composite layer) can be used in this invention to achieve significantly improved barrier compared to the PET-9921 control (Comparative Example 1) and significantly improved haze (decrease from 20% to 1.7%) compared to the orienting polymer-platelet monolayer film (Comparative Example 2).

Comparative Example 3

This example illustrates the poor dispersion and permeability results obtained when sodium montmorillonite without additional treatement is melt compounded with PET. 9.27 grams (2 weight percent) and 23.89 grams (5 weight percent) of Kunipia F, which is a commercial sodium montmorillonite with cation exchange capacity of 119 milliequivalents per 100 grams available from Kunimine Ind. Co., were dry mixed with PET-9921 (Eastman Chemical Company. I.V. of about 0.72 dL/g, terephthalate residues and glycol residues of about 3.5 mole % 1,4-cyclohexane dimethanol, about 1.5 mole % diethylene glycol, and about 95 mole % ethylene glycol). The mixture was dried in a vacuum oven for 24 hours at 120° C. then extruded at a melt temperature of 280° C. on a Leistritz Micro 18 mm twin screw extruder using general purpose screws. The extrudate was quenched in water and chopped into pellets as it exited the die. The composites were found to have inherent viscositites of 0.60 dL/g and 0.56 dL/g for the 2 and 5 weight percent Kunipia F composites, respectively.

The above composite materials were crystallized at 150° C. in a forced air oven and dried overnight in a vacuum oven at 120° C. with a slight nitrogen purge. The dried materials were placed into a glass solid state polymerization units with a nitrogen purge of 14 scfh and heated by boiling diethyl succinate which has a boiling point of 218° C. After a period of 24 hours, heating was discontinued and the solid state polymerization units were allowed to cool. After cooling, the composite materials was removed. Analytical results showed that the composites had IV values of 0.88 dL/g and 0.85 dL/g for the 2 and 5 weight percent Kunipia F composites, respectively TEM imaging of these composites showed the presence of mostly large aggregates of tactoids with average thickness greater than about 100 nm and very few individual tactoids with thickness less than about 50–100 nm. WAXS analyses of the composites shows a distinct basal spacing of about 1.25 nm and 1.20 mn for the 2 and 5 weight percent Kunipia F composites, respectively.

The above polyester-platelet composites were dried overnight in a vacuum oven at 120° C. with a slight nitrogen purge. The dried materials were compression molded at 280° C. then quenched in ice-water to provide films with thickness of about 13 mil. Testing conducted on the films showed the oxygen permeabilities were 13.5 cc-mil/100 in$^2$-24 hr-atm and 12.4 cc-mil/100 in$^2$-24 hr-atm for the 2 and 5 weight percent Kunipia F composites, respectively. Thus, these polyester-particle composites do not have significantly improved barrier properties compared to clay free PET. The compression molded films were clear but contained visible particles. Haze measurements on the films produced percent haze values of 11 percent and 36 percent for the 2 and 5 weight percent Kunipia F composites, respectively.

The compression films were biaxially stretched 4×4 at about 100° C. in a T.M. Long instrument. The resulting oriented films were clear but had increased haze related to the visible particles. The measured percent haze values were found to be 18% and 40% for the 2 and 5 weight percent Kunipia F composites, respectively.

Comparative Examples 4 and 5

These examples illustrate the poor dispersion and permeability results obtained when sodium montmorillonite without additional treatement is added during polymerization of PET.

115 grams of oligo(ethylene terephthalate) (number average molecular weight of about 867 g/mole), 4.59 grams of 1,4-cyclohexane dimethanol, and either 2.99 grams or 7.72 grams of Kunipia F, which is a commercial sodium montmorillonite with cation exchange capacity of 119 milliequivalents per 100 grams available from Kunimine Ind Co., were charged to a single-neck, 1-L round-bottom flask. The appropriate amounts of metal catalyst solutions were added to provide 20 ppm titanium, 40 ppm phosphorus, 80 ppm cobalt, and 230 ppm of antimony in the final composite. The flask was fitted with a stainless steel stirring rod and a polymer head, consisting of a short distillation column and nitrogen inlet. The flask was purged with nitrogen by alternating vacuum to 100 torr and nitrogen. The flask was given a dynamic nitrogen atmosphere by passing nitrogen through the nitrogen inlet at a rate of about 0.3 standard cubic feet per hour (scfh). A metal bath, which was preheated to 220° C., was raised until it covered the flask. After the solid monomers melted, stirring at 150 rotations per minute (rpm) was begun. The temperature was held at 220° C. for 15 minutes to allow the 1,4-cyclohexane dimethanol to react. The metal bath temperature was increased to 280° C. over a period of about 15 minutes. With stirring at 150 rpm at 280° C., vacuum of less than 0.3 torr was applied to the melt gradually over a period of 15 minutes to prevent foaming. Vacuum of less than 0.3 torr, temperature of 280° C., stirring at 150 rpm was maintained for 15 minutes, during which time ethylene glycol condensate collected in a receiving flask and the viscosity of the melt increased. Then, the metal bath was lowered, the vacuum was released with nitrogen, stirring was stopped, and the composite cools to a semicrystalline solid. The composite was released from the glass flask by melting the outer edges of the polymer by immersing the flask into the metal bath, which was preheated to 290° C., and applying enough torque on the stirring rod to allow the composite to release from the flask wall. After cooling to room temperature, the flask was broken, and the composite was then broken from the stirrer using a hydraulic cutter. The composite pieces were ground to pass a 4 mm mesh screen then fine particles were removed using a 0.85 mm mesh screen to give about 160 g of a polyester-platelet precursor material. Analytical analyses showed the composite materials have an IV values of 0.50 dL/g and 0.41 dL/g for the 2 and 5 weight percent Kunipia F composites, respectively.

The above composite materials were crystallized at 150° C. in a forced air oven and dried overnight in a vacuum oven at 120° C. with a slight nitrogen purge. The dried materials were placed into a glass solid state polymerization units with a nitrogen purge of 14 scfh and heated by boiling diethyl succinate which has a boiling point of 218° C. After a period of 48 hours, heating was discontinued and the solid state polymerization units were allowed to cool. After cooling, the composite materials was removed. Analytical results showed that the composites had IV values of 1.12 dL/g and 1.27 dL/g for the 2 and 5 weight percent Kunipia F composites, respectively. TEM imaging of these composites showed the presence of mostly large aggregates of tactoids with average thickness greater than about 100 nm and very few individual tactoids with thickness less than about 50–100 nm. WAXS analyses of the composites shows a distinct basal spacing of about 1.45 nm and 1.46 mn for the 2 and 5 weight percent Kunipia F composites, respectively.

The above polyester-platelet composites were dried overnight in a vacuum oven at 120° C. with a slight nitrogen purge. The dried materials were compression molded at 280° C. then quenched in ice-water to provide a clear films with thickness of about 13 mil. Testing conducted on the films showed the oxygen permeabilities were 11.9 cc-mil/100 in$^2$-24 hr-atm and 10.8 cc-mil/100 in$^2$-24 hr-atm for the 2 and 5 weight percent Kunipia F composites, respectively. Thus, these polyester-particle composites do not have significantly improved barrier properties compared to clay free PET. The compression molded films are clear but contain visible particles. Haze measurements on the films produced percent haze values of 12 percent and 16 percent for the 2 and 5 weight percent Kunipia F composites, respectively.

The compression films were biaxially stretched 4×4 at about 100° C. in a T.M. Long instrument. The resulting oriented films were clear but had increased haze related to the visible particles. The measured percent haze values were found to be 51% and 59% for the 2 and 5 weight percent Kunipia F composites, respectively.

Trilayer films with PET (9921, from Eastman Chemical Company) as the outer layers and materials made in the present Comparative Examples was formed. The total thickness of the film was 1.63 mils and the thickness of the center layer was 0.32 mils. The oxygen permeability was 9.6 cc-mil/100 in$^2$-24 hr-atm and 11.0 cc-mil/100 in$^2$-24 hr-atm for the 2 and 5 weight percent Kunipia F composites, respectively. The films were cast, biaxially oriented as above and analyzed for optical properties. Both films were clear, but had visible particles throughout. The presence of visible particles clearly indicates that the platelet particles are not well dispersed in the films of the prior art. This observation is confirmed by the lack of barrier improvement in the prior art film.

Figure 2:
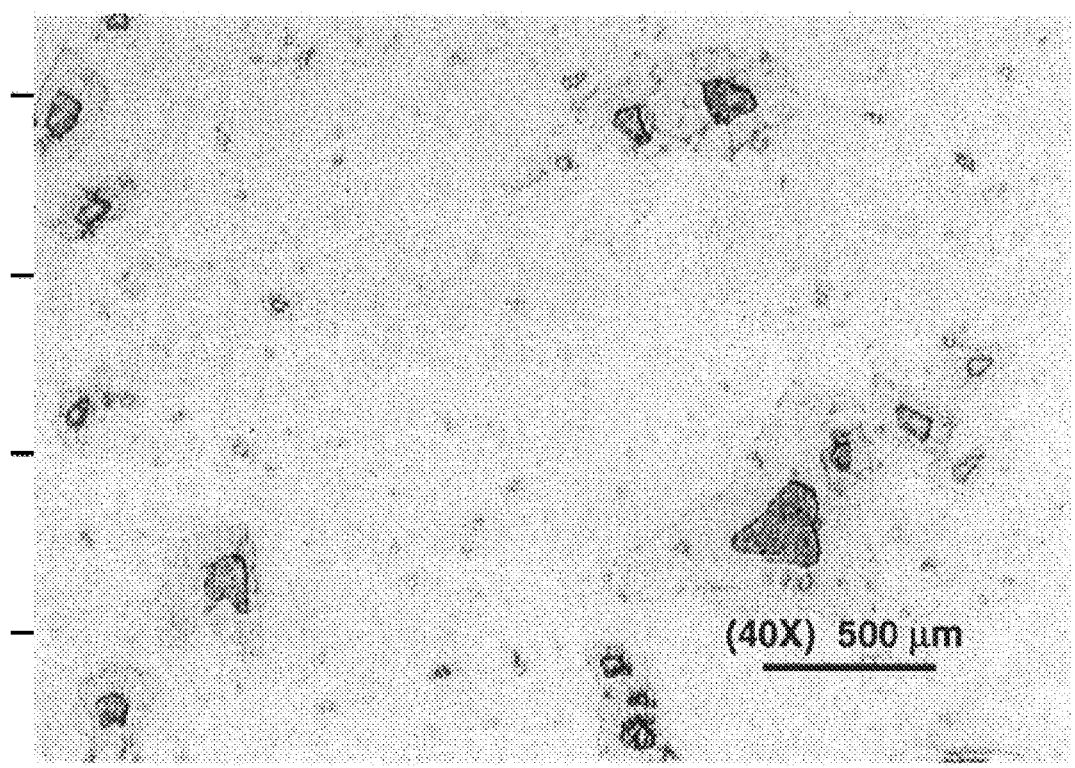
FIG. 2 is a photomicrograph of a trilayer film of the prior art at 40X.

FIGS. 1 and 2 clearly show the difference between the trilayer films of the present invention and the prior art. FIG. 1 is a micrograph at 40X of the trilayer film prepared in Example 3. The platelet particles appear as barely visible, well spaced dots. Platelet particles visible at 40X magnification are >5 microns in diameter and total 250 visible particles or 33 visible particles/mm$^2$. At 40X, only particles which are above about 5 microns can be seen. The mean platelet particle size, computed as circular equivalent diameter is 7.2 (std. Dev. 3 3) microns. Particle size analysis was performed using Visilog 5 software by Noesis Vision Inc. It was surprising that particles which are small as those in the film of Comparative Example 2 would create substantial haze upon orientation.

FIG. 2 shows the trilayer film prepared from the material produced in Comparative Example 4. The platelet particles are clearly agglomerated in large clumps, which exceed about 15 microns in diameter. The average particle size is 15.0 microns, ranging from 5 microns to 402 microns. The total visible particles in this analysis were 918, and there are 122 visible particles/mm$^2$ area. Clearly, the films of comparative example 4 have over 400% more particles greater than 15 microns and about 400% more particles/mm$^2$ compared to films of the present invention.

We claim:

1. A multilayer, oriented structure having improved oxygen barrier comprising at least one inner layer comprising a melt-processible carrier polymer and at least 0.01 weight % platelet particles, the at least one inner layer disposed between at least two outer layers comprising a platelet particle-free resin, wherein the carrier polymer is selected from the group consisting of polyester, wholly aromatic polyester, water dispersible polyester, polyamide, a copolymer of ethylene and vinyl alcohol, ethyl-vinyl acetate copolymer, polyimide, polycarbonate, polystyrene, polyvinylchloride (PVC), polyacrylate, polyolefin, and a mixture thereof, wherein the multilayer structure displays a haze value of less than 2%, and wherein each layer of the multilayer structure is oriented.

2. The multilayer structures of claim 1 wherein the structure displays a permeability to oxygen which is at least 10% lower than permeability to oxygen of a film of the platelet particle-free resin alone.

3. The multilayer structure of claim 1 wherein the platelet particles have a mean platelet particle diameter of less than 10 microns.

4. The multilayer structure of claim 1 wherein said platelet particles have a mean platelet particle diameter of less than 7 microns.

5. The multilayer structure of claim 1 wherein the at least two outer layers comprise a melt processible synthetic polymeric material.

6. The multilayer structure of claim 5 wherein the at least two outer layers are independently selected from the group consisting of a polyester, wholly aromatic polyester, water-dispersible polyester, polyamide, polyimide, a copolymer of ethylene and vinyl alcohol, a copolymer of ethylene and vinyl acetate, polycarbonate, polystyrene, polyvinylchloride (PVC), polyacrylate, polyolefin, and a mixture thereof.

7. The multilayer structure of claim 5 wherein the at least two outer layers are independently selected from the group consisting of polyester, a copolymer of ethylene and vinyl acetate, a copolymer of ethylene and vinyl alcohol, a polyamide, and a mixture thereof.

8. The multilayer structure of claim 1 wherein the melt-processible carrier polymer is selected from the group consisting of a polyester, wholly aromatic polyester, water dispersible polyester, polyamide, polyimide, polycarbonate, polystyrene, polyvinylchloride (PVC), polyacrylate, polyolefin, and a mixture thereof.

9. The multilayer structure of claim 1 wherein the melt-processible carrier polymer is selected from the group consisting of a polyester, polyamide, and a mixture thereof.

10. The multilayer structure of claim 1 wherein the platelet particles are present in the melt-processible carrier polymer in an amount from 0.01 weight % to 50 weight %.

11. The multilayer structure of claim 1 wherein the melt-processible carrier polymer is selected from the group consisting of a polyester, polyamide, and a mixture thereof and the platelet particle-free resin of the at least two outer layers is a polyester.

12. The multilayer structure of claim 1 wherein the melt-processible carrier polymer comprises less than 100 visible platelet particles/mm$^2$ at a magnification of 40X.

13. The multilayer structure of claim 1 wherein the melt-processible carrier polymer comprises less than 50 visible platelet particles/mm$^2$ at a magnification of 40X.

14. The multilayer structure of claim 1 wherein the melt-processible carrier polymer comprises less than 30 visible platelet particles/mm$^2$ at a magnification of 40X.

15. The multilayer structure of claim 1 wherein the melt-processible carrier polymer is poly (m-xylylene adipamide).

* * * * *